Figure 1:
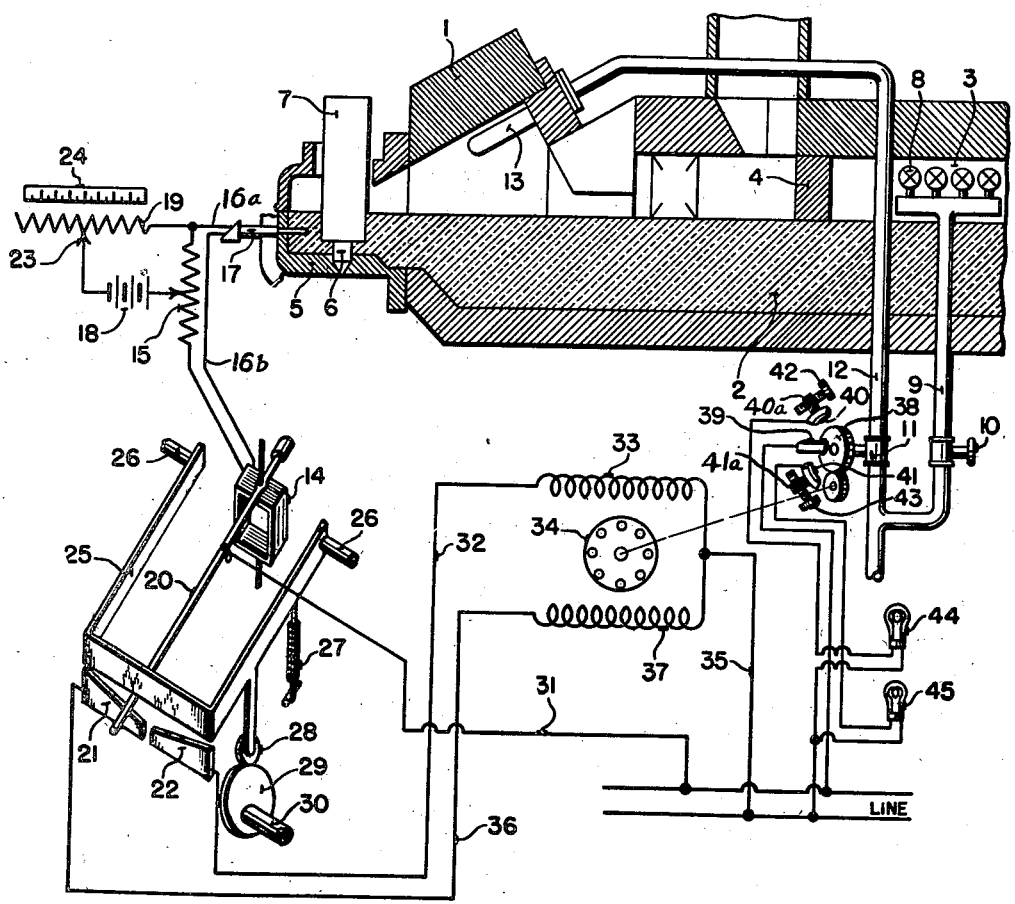

Feb. 6, 1945.  H. O. McGILLIN ET AL  2,368,937

MEASURING AND CONTROL INSTRUMENT

Filed May 4, 1940

INVENTOR
HOWARD O. McGILLIN
JOSEPH P. VOLLRATH
BY
ATTORNEY

Patented Feb. 6, 1945

2,368,937

UNITED STATES PATENT OFFICE 2,368,937

MEASURING AND CONTROL INSTRUMENT

Howard O. McGillin and Joseph P. Vollrath, Philadelphia, Pa., assignors to The Brown Instrument Company, Philadelphia, Pa., a corporation of Pennsylvania Application May 4, 1940, Serial No. 333,324

7 Claims. (Cl. 49—54)

The present invention relates to temperature measuring instruments and more particularly to apparatus for accurately measuring and closely controlling the temperature of molten glass in a glass making furnace.

It is a specific object of the invention to provide a protecting tube for a thermocouple that is to be inserted in the molten glass in a furnace. This protecting tube is designed to have sufficient strength to withstand the action of the glass at the high temperatures to which it is subjected and at the same time cause only a very small lag due to heat transfer through the tube.

The protecting tube of the invention may be used either with base metal or noble metal thermocouples, and with either type of couple the response is equally as rapid due to the low heat transfer lag of the protecting tube.

It is a further object of the invention to locate the thermocouple at a point in the molten glass that is significant with respect to the gob temperature. This is possible because of the strength of the protecting tube. Another object of the invention is to provide a protecting tube and thermocouple that may be readily removed for checking purposes.

It is a further object of the invention to use a base metal thermocouple with the protecting tube of the invention in order to procure a wide millivolt range of the thermocouple E. M. F. and a corresponding sensitivity of the measuring instrument at the high temperatures which are encountered in glass manufacture.

It is a further object of the invention to provide a means to indicate when the various sections of burners in a glass furnace are supplying more or less than their portion of the total heat.

Heretofore it has not been practical to use base metal thermocouples in the manufacture of glass because of the extremely high temperatures and the short life of the thermocouples due to a lack of a proper type of protecting tube. As is well known a noble metal thermocouple, for example, platinum-platinum, rhodium, has a smaller millivolt span for a given temperature change than does a base metal thermocouple such as, for example, chromel-alumel. When it is desired to maintain the temperature of a substance within close limits it is desirable to have as wide a millivolt span as possible for a given temperature range in order to obtain the greatest possible galvanometer sensitivity. Therefore, if possible, a base metal thermocouple should be used. We have found that by means of the protecting tube shown herein it is possible to use base metal thermocouples for high temperatures to obtain results, the accuracy of which has not previously been matched.

In a glass furnace the glass passes from the melting and refining zones of the furnace through a channel to a forehearth, from which it is fed to a glass forming machine. Burners are located at intervals along the channel and in the forehearth, which burners are used to bring the glass to the proper temperature and viscosity for the type of ware that is to be formed. Generally the burners in the channel are manually adjusted to supply a fairly large portion of the total heat necessary while the burners in the forehearth are automatically adjusted to supply the remaining heat. At times, due to various reasons, the channel burners may supply more than enough or not enough heat so that the control system automatically cuts off or opens wide the forehearth burners. When this occurs there is, in effect, no control of the glass temperature since only one set of burners is going and that at a fixed rate. In order to overcome such an undesirable condition we provide a signal means that is connected to the forehearth burner control, which signal means indicates when the control is approaching one or the other of its limits. Such an indication shows that the channel burners are supplying more or less than their proportion of the heat and should be adjusted manually in a direction so that the forehearth burners will supply more nearly their proper percentage of the total heat. In this manner it is insured that the forehearth burners will always be on and that they will be supplying a controllable percentage of the total heat and that the glass temperature will always be subject to control.

Keeping the temperature of the gobs of glass as they are dropped from the forehearth into the moulds at a constant value is extremely important in the formation of the glassware. In order to do a good job it is therefore necessary to place the temperature measuring element at a point where the temperature is significant with respect to that of the gob. Prior to this invention, it has been customary to control the forehearth burners in response to a measurement made by a bare thermocouple just within the furnace wall. It has been found, however, that there is a large temperature gradient from the center of the mass of glass toward the forehearth wall, so that a thermocouple placed just within the forehearth wall does not give a true picture of the temperature of the glass near its exit point. It is impossible to extend a bare thermocouple further into the glass as it would be broken by the moving glass. No protecting tube has been found prior to that of this invention which was strong enough to stand up under the action of the glass at the necessarily high temperature encountered, which protecting tube would not contaminate the glass. The protecting tube disclosed herein will, however, retain its strength at extreme temperatures and will not harm the glass into which it is immersed.

The various features of novelty which characterize our invention are pointed out with particularity in the claims annexed to and forming a part of this specification. For a better understanding of the invention, however, its advantages and specific objects obtained with its use, reference should be had to the accompanying drawing and descriptive matter in which we have illustrated and described a preferred embodiment of the invention.

Figure 2:
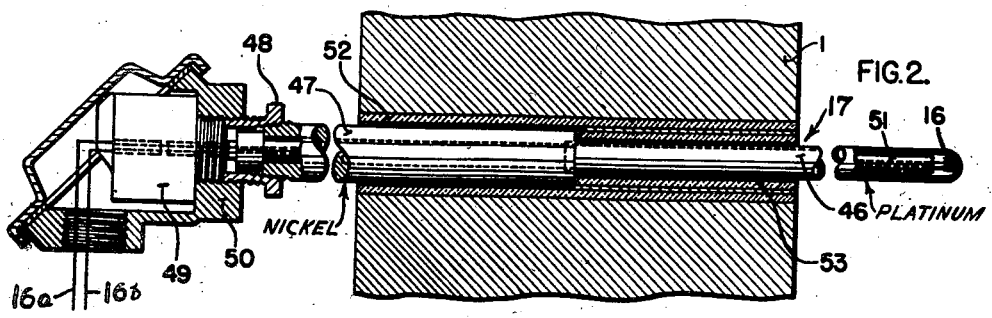

In the drawing:

Fig. 1 is a diagrammatic view, partly in section, of a glass furnace and a temperature control system therefor; and Fig. 2 is a view partly in section of our protecting tube.

Referring to Figure 1, there is shown part of a glass furnace 1, the molten glass 2 passing through a channel 3 toward the left under a bridge wall 4 toward the forehearth portion 5 of the furnace. The glass is fed from the forehearth through an orifice, controlled by a plunger 6 and a rotating tube 7, in gobs of a suitable size and shape. In order to accurately control the gob it is necessary that the temperature of the glass be controlled within extremely narrow limits. To this end the glass is heated as it passes to the forehearth by a group of channel burners 8 that are supplied with fuel through a pipe 9 having in it a hand controlled valve 10. In the forehearth a thermocouple is inserted in the glass near the tube 7 and the temperature of the glass as measured thereby is used to control the opening of a valve 11 in a fuel line 12 that supplies fuel to the forehearth burner 13.

As is shown in Figure 1 the glass temperature is measured by a galvanometer 14 included in a measuring circuit of the deflection potentiometric type, and comprising a resistance 15 in series with the galvanometer and a thermocouple 16 that is subjected to the temperature of the glass. This thermocouple is placed in a protecting tube 17, the details and location of which will be described below, and is connected to the measuring circuit by lead wires 16a and 16b. There is an energizing shunt about a variable portion of the resistance 15 which comprises a battery 18 and an adjustable resistance 19. With such a potentiometer measuring circuit, the voltage effect on the galvanometer of the battery 18, with a suitable battery voltage and adjustment of the connections of the battery to the resistances 15 and 19, will be exactly neutralized by the thermocouple voltage at the predetermined normal glass temperature. At that temperature a galvanometer pointer 20 will occupy a neutral position between and above members 21 and 22, from which it will deflect as the glass temperature changes. In order to obtain a neutral position of the galvanometer pointer 20 for different glass temperatures a contact 23 may be moved along the resistance 19 to change the effective E. M. F. of the battery. A scale 24 may be provided to indicate the adjustment of the contact 23.

The potentiometer may be of the type disclosed in Harrison Patent 2,162,469, granted on June 13, 1939, but is diagrammatically shown herein. In the present showing pointer 20 is periodically moved toward the members 21 and 22 by means of a yoke-shaped member 25 that is pivoted at 26 and biased toward engaging position by a spring 27. The yoke is moved away from the members 21 and 22 by means of engagement between a cam follower 28 attached thereto and a cam 29 on a constantly rotating shaft 30.

If, for example, the temperature of the glass is too high the pointer 20 will deflect over member 22 and, when brought into engagement therewith by yoke 25, will complete an electrical circuit from one side of the line through conductor 31, pointer 20, member 22, conductor 32, field 33 of reversible valve operating motor 34 and conductor 35 to the other side of the line. The motor 34 is accordingly energized for rotation in a direction to close the valve 11. The motor is energized for a length of time depending upon the amount of deflection of the pointer 20 from neutral. This is due to the fact that the upper edge of member 22 is at an angle to the horizontal and the further from neutral the pointer is, the longer it will be in engagement with member 22 during each cycle. This is true because the yoke 25 is being raised and lowered at equal time intervals, and the more the pointer 20 is deflected the sooner in each time interval the motor 34 will be energized to rotate and the later it will be deenergized. For a decrease in the glass temperature pointer 20 will engage member 21 to complete a circuit from one side of the line through conductor 31, pointer 20, member 21, conductor 36, field 37 of motor 34 and conductor 35 to the other side of the line. This energizes the motor for rotation in a direction to open the fuel valve 11.

From a study of Figure 1, it will be seen that a certain deflection of the pointer 20 will be needed to produce a given valve adjustment. If the pointer may be made to deflect more for a given temperature change, the speed of the valve motor may be slowed down with a consequent decrease in the increments of valve adjustment with an increase in the accuracy of temperature control. On the other hand a very insensitive control, or small deflection of the galvanometer for a given temperature change, may necessitate an inclination of the upper edges of the members 21 and 22 that is so steep that slipping of the pointer relative thereto will occur during the clamping movement of yoke 25.

It is, therefore, of advantage to use a thermocouple that will produce the largest possible change in E. M. F. for a given temperature change. It is also necessary to have a thermocouple that will stand up under the excessive temperatures which will be encountered in the manufacture of glass. Previous to the present invention it was necessary to use a noble metal thermocouple such as platinum-platinum, rhodium for work of this type in order to stand up under the heat and action of the glass. For a temperature range, for example, 1800° F.–2300° F. a platinum thermocouple will produce from 9.36 to 12.64 millivolts or a difference of 3.20 millivolts. A base metal thermocouple such as chromel-alumel for the same range of 1800° F.–2300° F. will produce from 40.62 to 51.00 millivolts or a difference of 10.38 millivolts.

Therefore, anything that will permit the use of such a base metal thermocouple is a definite advance in the art. The protecting tube of the present invention has made the use of a thermocouple of the latter type possible, so far as we are aware, for the first time, in the glass manufacturing industry.

The valve 11 is driven by the motor 34 through a gear train including a gear 38 that has attached to and electrically insulated from it a contact 39. This contact is moved with the gear and at some point in its path of movement is adapted to engage either contact 40 or contact 41. These latter contacts are each mounted on insulating supports 40a and 41a respectively, which supports may be adjusted circumferentially of the gear 38 by means of the screws 42 and 43. The contacts 40 and 41 are so placed relative to the gear 38 that they will be engaged by the contact 39 as the valve 11 is nearly closed or nearly opened respectively. Engagement between contact 39 and contacts 40 or 41 closes a circuit to any suitable alarm or signal, shown herein as lights 44 or 45, respectively, which lights may be of different colors to indicate the position of valve 11.

In the operation of a glass furnace it is customary to adjust the valve 10 so that the channel burners supply a fixed portion of the total heat, which portion may vary depending upon the type of furnace and the type of glass being made. The remainder of the heat is supplied by the forehearth burner 13. Since the heat that is needed varies from time to time the forehearth burners are controlled in accordance with the heat need. If, for example, the need for the heat drops off the control instruments will run the motor 34 in a direction to close valve 11. After a time the control valve will be completely closed and the furnace is then, in effect, without any control at all and the glass may be ruined. With the present system just prior to the time that the valve 11 is closed a circuit is completed through the signal light 44 to indicate this fact to the operator. The operator will then manually close valve 10 to reduce the heat supplied by burners 8 so that the control system will call for more heat from burner 13, with a consequent opening of valve 11. If the furnace had needed more heat the valve 11 would have opened until light 45 was energized. The operator would thereupon have opened valve 10 to produce an automatic closing movement of valve 11. Thus when the valve 11 is approaching one of its limits a signal is given so that the operator may adjust the channel burners so that they continue to supply their percentage of the total heat, and the forehearth burner is never completely opened or closed. In this manner the furnace is at all times subject to control.

The protecting tube 17 in which the thermocouple 16 is placed and is preferably located so that it projects through an opening in the furnace wall until its tip is approximately half way between the outer surface of the tube 7 and the inner wall surface and about two inches below the glass surface. This location is chosen because it is believed that at this point the end of the protecting tube will generally be at a temperature which accurately reflects the temperature of the gob. This location, however, may well vary for different types of furnaces, the controlling condition being that there is a definite relation between temperature of the gob and the temperature recorded by the thermocouple. The protecting tubes consists of a thin closed end platinum tube 46 of high heat conductivity which is flame welded to a nickel extension tube 47. Both the platinum and nickel can stand up under the heat of the molten glass, and the platinum is not affected by the destructive action of the molten glass, nor does it contaminate the glass. The nickel tube serves to rigidly support the platinum tube in place without any appreciable deterioration due to the heat. The end of tube 47 opposite the tube 46 is threaded to receive a collar 48 that supports a terminal block 49 and a protective housing 50. The hot junction of the thermocouple 16 is grounded against the interior of the end of tube 46 as is shown in the drawing. This, along with the thinwall of the tube, insures that there will be no lag between changes in glass temperature and response thereto by the thermocouple. The thermocouple lead wires 16a and 16b are led through an opening in the bottom of the housing 50 to the terminal block 49 where they are attached to the wires of the thermocouple 16. It is noted that back of its tip, the thermocouple is protected by the usual insulating tube 51.

In inserting the protecting tube in the furnace an opening is made in the furnace wall in which is placed a ceramic lining member 52 of a diameter sufficient to receive the tube 47. Cemented in this lining is a shorter ceramic sleeve 53 whose inside diameter is sufficiently large to receive the tube 46, but too small for the tube 47. The left end of this sleeve then acts as a stop to limit the insertion of the tube into the furnace. Any small opening that may exist between the tube 46 and sleeve 53 will be filled with molten glass which will freeze before it has reached the end of sleeve 53.

The manner in which the protecting tube is inserted in the furnace permits it to be easily removed for insertion into another furnace or during cleaning periods of the furnace in which it is used. Furthermore the thermocouple may be removed from the protecting tube at any time for checking purposes.

While the protecting tube has been described as being used with a base metal thermocouple, it is obvious that it may be used to protect a noble metal thermocouple equally as well. It is also pointed out that while the protecting tube is described in connection with a glass furnace, it may be used any place in which the presence of platinum is not objectionable. It is pointed out that other metals having characteristics similar to those of platinum may, upon occasion, be used for the tube 46.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. In combination with an enclosure whose temperature is to be measured, said enclosure being provided with an opening, a lining member for said opening formed with an internal shoulder, a protecting tube formed with an external shoulder extending through said lining member, the shoulders being adapted to abut each other to limit the extent to which said protecting member can extend into the enclosure, and a temperature responsive element in said protecting tube.

2. In combination with an enclosure the temperature of which is to be measured, said enclosure having an opening with a shoulder formed therein, a relatively thick metal tube extending partially through said opening and abutting said shoulder, a relatively thin metal tube having one end closed and integrally attached at its open end to the end of the thick tube that is within said opening, the closed end of the thin tube projecting into the enclosure a distance limited by engagement between said thick tube and shoulder, and a temperature sensitive element located in said tubes.

3. The method of controlling the heat supply to a glass containing furnace having a channel burner and a forehearth burner which comprises adjusting the channel burner to supply a given amount of heat to the glass, which amount of heat may be too much or too little, adjusting the forehearth burner to supply the remaining heat, until the latter burner reaches predetermined open or closed limits, signaling the attainment of those limits, and thereafter readjusting the channel burner to supply more or less heat depending upon whether the forehearth burner has reached its upper or lower limit.

4. The method of controlling the heat supply to a glass containing furnace having a channel burner and a forehearth burner each of which is supplied with fuel through a line having a valve in it, which comprises adjusting the valve in the channel burner supply line so that the burner will supply a given amount of, either too much or too little heat to the glass, adjusting the valve in the supply line to the forehearth burner so that burner will supply the remaining heat necessary until that valve is nearly open or nearly closed, signaling the attainment of the nearly open or closed condition of the valve, then readjusting the valve in the supply line for the channel burner to supply more or less fuel to said burner if the valve in the forehearth burner supply line is nearly open or nearly closed, respectively.

5. In combination with a glass furnace having a channel and a forehearth, the glass flowing through the channel to the forehearth where it is discharged, burners in said channel to heat the glass passing through the same, a fuel supply line for said burners, a manually operated valve in said fuel supply line, burners in said forehearth to heat the glass therein, a fuel supply line for said burners, an automatic control valve in said fuel line, means responsive to the temperature of the glass in the forehearth, mechanism to adjust said automatic control valve, an instrument to adjust said last mentioned mechanism operated in accordance with the temperature of the glass in the forehearth as measured by said temperature responsive means, signal means, and means to operate said signal means when said automatic control valve has reached a predetermined open or closed position to indicate when said manually operated valve should be operated.

6. In combination with a glass furnace having a forehearth adapted to be controlled to some particular temperature, said forehearth having an opening with a shoulder facing outwardly, a protecting tube extending through said opening into said furnace, said protecting tube consisting of a thick walled nickel tube, a thin walled platinum tube flame welded to the end of said nickel tube and having a shoulder at the welded joint, said shoulder on said nickel tube engaging the shoulder in the opening to limit the immersion of the platinum tube in the forehearth, and a thermocouple extending into said protecting tube to measure the temperature of the forehearth.

7. A temperature measuring assembly for measuring the temperature in an enclosure provided with an opening having an internal shoulder, a thin walled tubular platinum member closed at one end and adapted to project through the opening into the enclosure and a thick walled tubular nickel member attached to the open end of the thin walled tubular platinum member to form an external shoulder at the point of juncture, said thick walled tubular nickel member being operative to support the thin walled tubular platinum member in temperature measuring position in the enclosure and the external shoulder being operative to cooperate with the internal shoulder of the opening to limit the extent to which the thin walled tubular platinum member extends into the enclosure.

HOWARD O. McGILLIN.
JOSEPH P. VOLLRATH.